United States Patent [19]

Boyd et al.

[11] Patent Number: 5,508,766
[45] Date of Patent: Apr. 16, 1996

[54] UNDERWATER CAMERA UNIT WITH CANTILEVERED SHUTTER RELEASE DEVICE

[75] Inventors: James D. Boyd, Rochester; Charles W. Greene, Clarence Center, both of N.Y.

[73] Assignee: Eastman Kodak Company, Rochester, N.Y.

[21] Appl. No.: 369,962

[22] Filed: Jan. 9, 1995

[51] Int. Cl.⁶ ................................................. G03B 17/08
[52] U.S. Cl. ................................................................. 354/64
[58] Field of Search ........................... 354/64, 266, 268, 354/288; D16/200, 208

[56] References Cited

U.S. PATENT DOCUMENTS

| | | | |
|---|---|---|---|
| D. 321,704 | 11/1991 | Leonard et al. | D16/200 |
| 3,019,715 | 2/1962 | Arnold et al. | 354/64 |
| 4,882,600 | 11/1989 | Van de Moere | 354/64 |
| 5,126,772 | 6/1992 | Albrecht | 354/64 |
| 5,239,324 | 8/1993 | Ohmura et al. | 354/64 |
| 5,339,124 | 8/1994 | Harms | 354/64 |

*Primary Examiner*—Howard B. Blankenship
*Attorney, Agent, or Firm*—Roger A. Fields

[57] ABSTRACT

An underwater camera unit comprises a camera body provided with a depressible shutter release button, and a water-resistant housing enclosing the camera body and provided with manually actuated means including a flexible housing section located over the shutter release button to be deflected to depress the shutter release button. According to the invention, the manually actuated means includes a substantially rigid cantilevered beam having a fixed end portion connected to the flexible housing section and a free end portion spaced from the flexible housing section, to permit the free end portion to be manually depressed towards the flexible housing section to create a torque at the fixed end portion which will deflect the flexible housing section to depress the shutter release button.

3 Claims, 3 Drawing Sheets

5,508,766

UNDERWATER CAMERA UNIT WITH CANTILEVERED SHUTTER RELEASE DEVICE

FIELD OF THE INVENTION

The invention relates generally to the field of photography, and in particular to underwater camera units.

BACKGROUND OF THE INVENTION

Prior art U.S. Pat. No. 4,882,600, issued Nov. 21, 1989, and U.S. Pat. No. Des. 321,704, issued Nov. 19, 1991, each disclose an underwater camera unit comprising a lighttight camera body provided with a depressible shutter release button, and a transparent water-resistant housing enclosing the camera body. The water-resistant housing has a flexible housing section which is located over the shutter release button to be manually deflected to depress the shutter release button. Ordinary finger pressure applied to the flexible housing section is used to manually deflect the flexible housing section. The flexible housing section must be stiff enough to withstand the water pressure at the maximum underwater depth intended for the camera unit, in order to avoid being accidentally deflected to depress the shutter release button. However, increasing the stiffness of the flexible housing section can make it difficult to manually deflect using finger pressure, when the camera unit is above-water.

SUMMARY OF THE INVENTION

According to the invention, an underwater camera unit comprising a camera body provided with a depressible shutter release button, and a water-resistant housing enclosing the camera body and provided with manually actuated means including a flexible housing section located over the shutter release button to be deflected to depress the shutter release button, is characterized in that:

the manually actuated means includes a substantially rigid cantilevered beam having a fixed end portion connected to the flexible housing section and a free end portion spaced from the flexible housing section, to permit the free end portion to be manually depressed towards the flexible housing section to create a torque at the fixed end portion which will deflect the flexible housing section to depress the shutter release button.

The cantilevered beam makes it easier to deflect the flexible housing section to depress the shutter release button using finger pressure, when the camera unit is above-water, as compared to prior art U.S. Pat. No. 4,882,600 and U.S. Pat. No. Des. 321,704.

DETAILED DESCRIPTION OF THE INVENTION

The invention is disclosed as being embodied preferably in an underwater camera unit such as disclosed in prior art U.S. Pat. No. 4,882,600 and U.S. Pat. No. Des. 321,704. Because the features of an underwater camera unit are generally known, the description which follows is directed in particular only to those elements forming part of or cooperating directly with the disclosed embodiment. It is to be understood, however, that other elements may take various forms known to a person of ordinary skill in the art.

Figure 1:
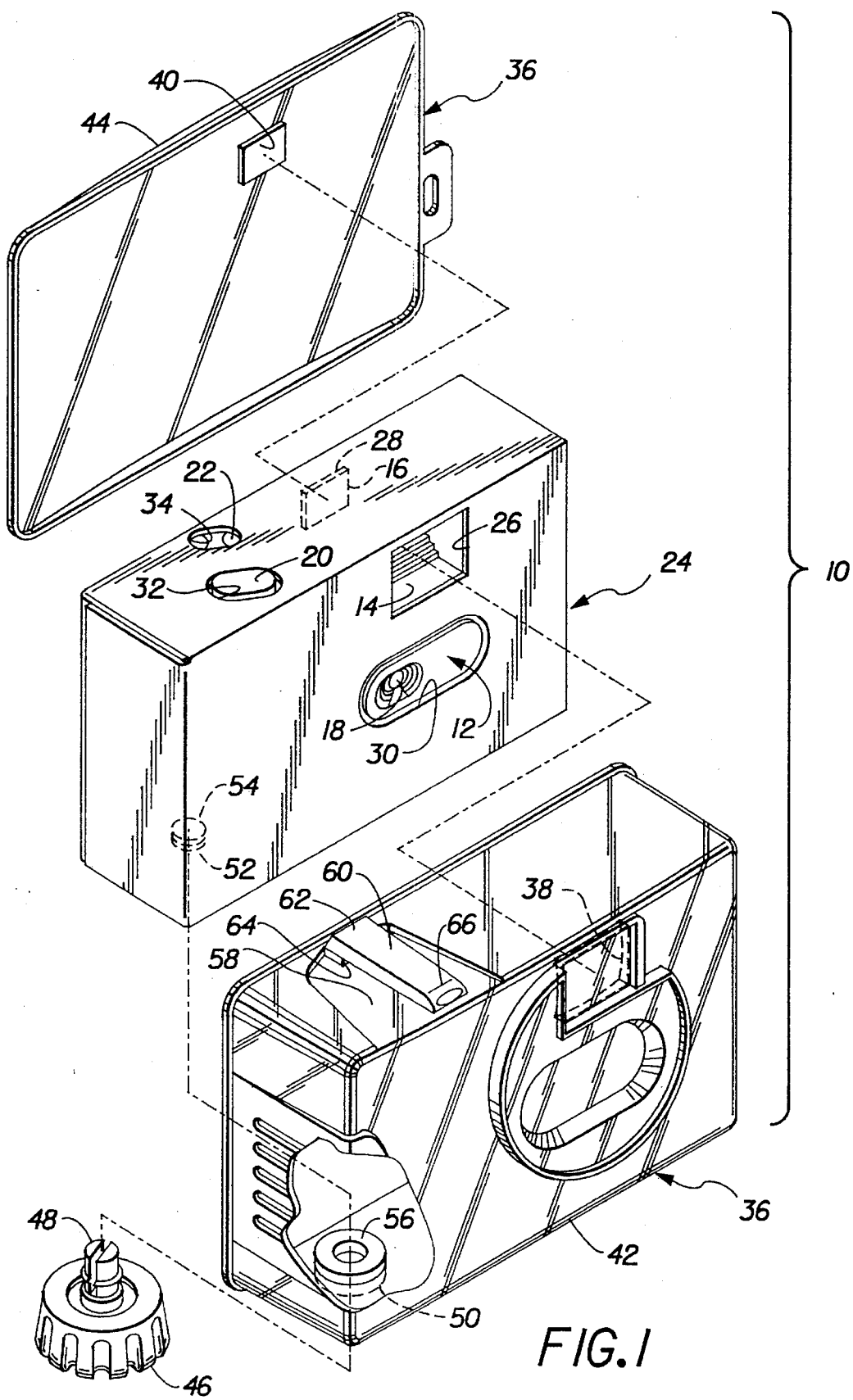
FIG. 1 is an exploded perspective view of an underwater camera unit according to a preferred embodiment of the invention, showing a photographic camera and a water-resistant housing.
Figure 2:
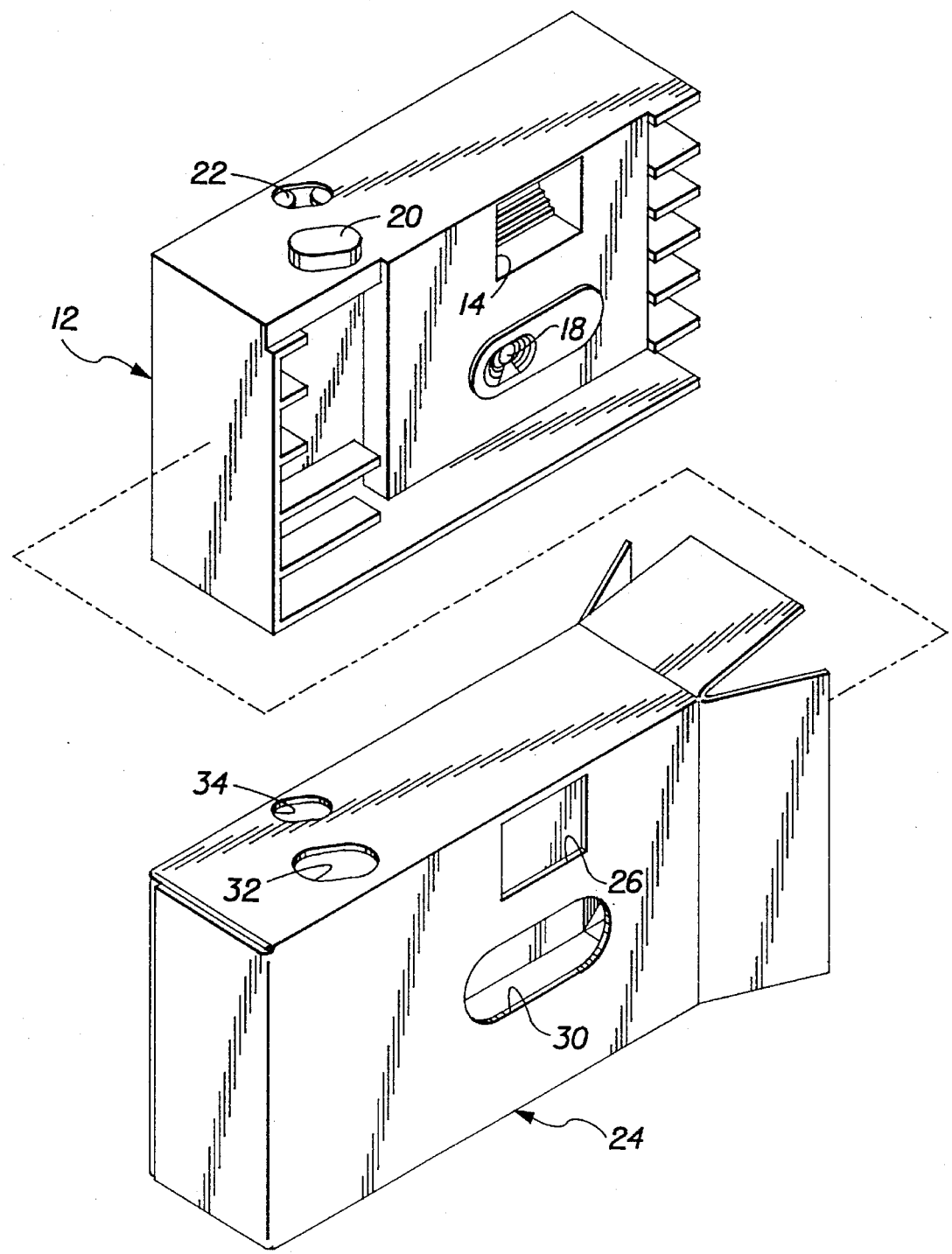
FIG. 2 is an exploded perspective view of the photographic camera depicted in FIG. 1.

Referring to the drawings, FIGS. 1 and 2 depict an underwater camera unit 10 which is a simple point-and shoot type. A lighttight plastic camera body 12 having a front view finder opening 14 and a rear viewfinder opening 16 for viewing a subject to be photographed supports various known camera components including a taking lens 18, a manually depressible shutter release button 20, and a frame or exposure counter 22. A decorative cardboard box 24 contains the camera body 12 and has respective holes 26, 28, 30, 32, and 34 for the front and rear viewfinder openings 14 and 16, the taking lens 18, the shutter release button 20, and the frame counter 22. A transparent plastic water-resistant housing 36 encloses the decorative box 24 with the camera body 12 contained in the decorative box. The water-resistant housing 36 has integrally formed front and rear viewfinder lenses 38 and 40 that optically align with the front and rear viewfinder openings 14 and 16, and it may be injection molded in two pieces 42 and 44 as shown in FIG. 1. The two pieces 42 and 44 are intended to be sealed together. A manually rotatable thumbwheel 46 has an axial post 48 which extends through respective aligned holes 50, 52, and 54 in the water-resistant housing 36, the decorative box 24, and the camera body 12 to operate a known film advance and metering mechanism (not shown) within the camera body. A rubber gasket or o-ring 56 is sandwiched between the openings 50 and 52 to prevent water from entering inwardly along the post 48.

Figure 3:
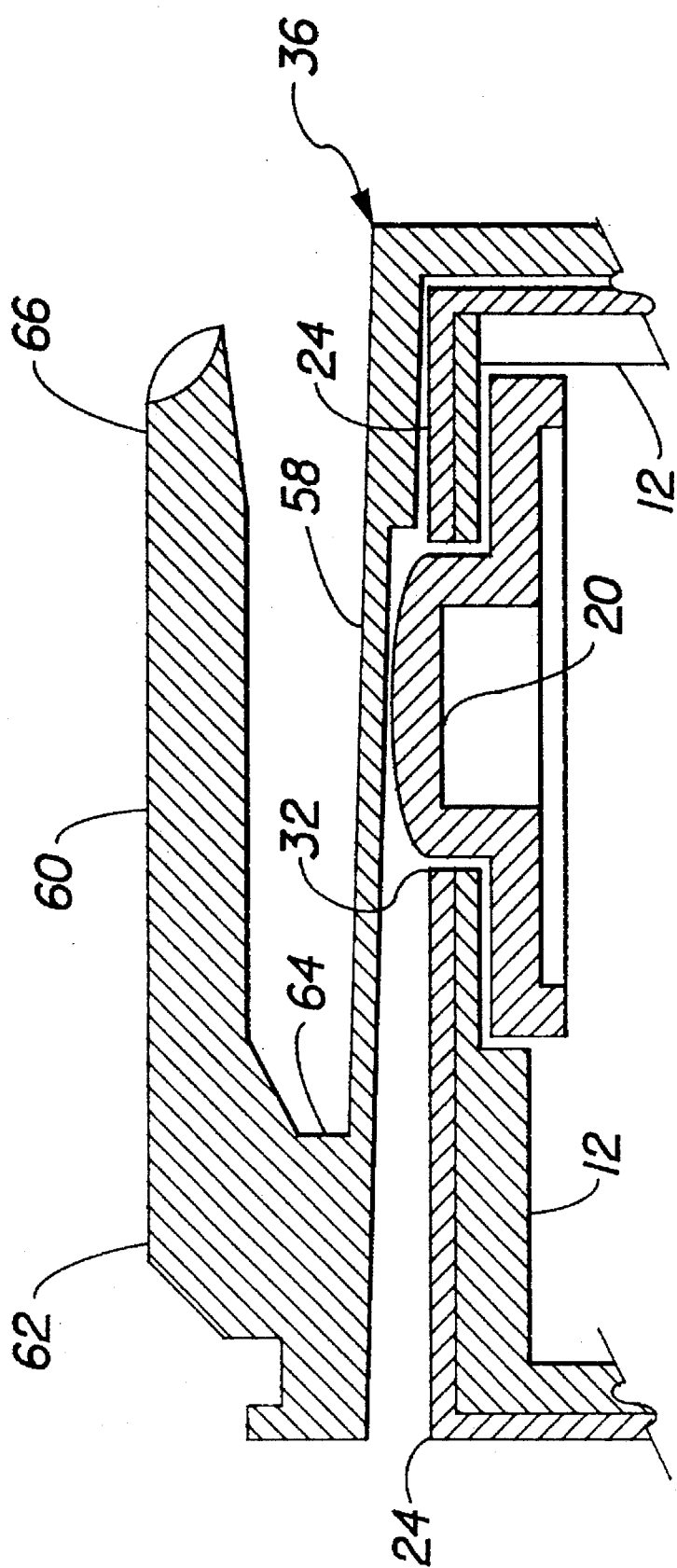
FIG. 3 is a sectional view of a cantilevered shutter release device included in the underwater camera unit.

The water-resistant housing 36 has a flexible housing section 58 located over the shutter release button 20 to be deflected inwardly to depress the shutter release button. See FIGS. 1 and 3. According to the invention, a substantially rigid cantilevered beam 60 has a fixed end portion 62 connected to the flexible housing section 58 at an intermediate base 64. Preferably, the cantilevered beam 60 and the intermediate base 64 are integrally formed with the water-resistant housing 36. A free end portion 66 of the cantilevered beam 60 is spaced from the flexible housing section 58 to permit the free end portion to be manually depressed towards the flexible housing section. This creates a torque at the intermediate base 64 which, in turn, is applied to the flexible housing section to thereby deflect the flexible housing section to depress the shutter release button 20.

The invention has been described with reference to a preferred embodiment. However, it will be appreciated that variations and modifications can be effected by a person of ordinary skill in the art without departing from the scope of the invention.

PARTS LIST 10. underwater camera unit
12. camera body
14. front viewfinder opening
16. rear viewfinder opening
18. taking lens 20. shutter release button
22. frame counter
24. decorative box
26. hole
28. hole
30. hole
32. hole
34. hole
36. water-resistant housing
38. front viewfinder lens
40. rear viewfinder lens
42. housing piece
44. housing piece
46. thumbwheel
48. post
50. hole
52. hole
54. hole
56. gasket
58. flexible housing section
60. cantilevered beam
62. fixed end portion
64. intermediate base
66. free end portion

We claim:

1. An underwater camera unit comprising a camera body provided with a depressible shutter release button, and a water-resistant housing enclosing said camera body and provided with manually actuated means including a flexible housing section located over said shutter release button to be deflected to depress the shutter release button, is characterized in that:

said manually actuated means includes a substantially rigid cantilevered beam having a fixed end portion connected to said flexible housing section and a free end portion spaced from the flexible housing section, to permit said free end portion to be manually depressed towards the flexible housing section to create a torque at said fixed end portion which will deflect the flexible housing section to depress said shutter release button.

2. An underwater camera as recited in claim 1, wherein said cantilevered beam is integrally formed with said flexible housing section.

3. A water-resistant housing for enclosing a camera body provided with a depressible shutter release button, comprising manually actuated means including a flexible housing section to be deflected to depress the shutter release button, is characterized in that:

said manually actuated means includes a substantially rigid cantilevered beam having a fixed end portion connected to said flexible housing section and a free end portion spaced from the flexible housing section, to permit said free end portion to be manually depressed towards the flexible housing section to create a torque at said fixed end portion which will deflect the flexible housing section to depress the shutter release button.

* * * * *